United States Patent [19]

Migita et al.

[11] Patent Number: 5,705,279
[45] Date of Patent: Jan. 6, 1998

[54] FIBRILLAR COPOLYESTER HAVING A LARGE ASPECT RATIO, PRODUCTION METHOD FOR THE SAME, AND A RESINOUS COMPOSITE MATERIAL CONTAINING THE SAME AS REINFORCEMENT

[75] Inventors: Ayako Migita; Kenji Hijikata, both of Shizuoka, Japan

[73] Assignee: Polyplastics Co. Ltd., Osaka, Japan

[21] Appl. No.: 591,729

[22] Filed: Jan. 25, 1996

[30] Foreign Application Priority Data

Jan. 25, 1996 [JP] Japan .................. 7-010046

[51] Int. Cl.$^6$ .................. B32B 27/06; C08G 63/06
[52] U.S. Cl. .................. 428/480; 528/361; 525/450; 524/770; 524/771; 428/480
[58] Field of Search .................. 528/361; 525/450; 524/770, 771; 428/480

[56] References Cited

U.S. PATENT DOCUMENTS 4,067,852  1/1978  Calundann .
4,161,470  7/1979  Calundann .

FOREIGN PATENT DOCUMENTS

A-6-65358  3/1994  Japan .
A-6-80769  3/1994  Japan .

OTHER PUBLICATIONS

"Whiskers 9. Synthesis of whisker-like crystals of poly(6-hydroxy-2-naphthoic acid)", Hans R. Kricheldorf et al., *High Performance Polym.* 6 (1994) pp. 109-121.

*Primary Examiner*—Samuel A. Acquah
*Attorney, Agent, or Firm*—Burns, Doane, Swecker & Mathis, L.L.P.

[57] ABSTRACT

A fibrillar copolyester having excellent heat resistance, a reinforcing effect and a large aspect ratio is produced with high dimensional stability and efficiency. A specific fibrillar copolyester having an aspect ratio of at least 3.0 is produced by polymerizing with shearing specific hydroxy aromatic carboxylic acid monomers as starting materials in a nonpolar solvent having 10 or more carbon atoms. Such hydroxy aromatic carboxylic acid monomers preferably have acetylated hydroxyl groups when copolymerized. Additionally, substituents other than hydrogen atoms optionally may be present on the rings of the aromatic monomers when forming the fibrillar copolyester.

17 Claims, No Drawings

FIBRILLAR COPOLYESTER HAVING A LARGE ASPECT RATIO, PRODUCTION METHOD FOR THE SAME, AND A RESINOUS COMPOSITE MATERIAL CONTAINING THE SAME AS REINFORCEMENT

FIELD OF THE INVENTION

This invention relates to a fibrillar copolyester having high heat resistance, a reinforcing effect for resin materials and the like and a large aspect ratio, a production method for the same, and a resinous composite material containing the same.

PRIOR ART

Heretofore, various types of plastic fibers have been proposed as reinforcements and have generally been produced by extruding thermoplastic polymers into fibers and cutting the fibers for use as fibrous reinforcement. Also, in recent years, a method for producing a fibrillar polymer (i.e., whiskers) of a polyester derived from polyoxybenzoic acid or polyoxynaphthoic acid has been proposed in JP-A-6-80769 (the term "JP-A" as used herein means an unexamined published Japanese patent application), JP-A-6-65358, Kricheldorf et al., High Perform. Polym. 6, (1994), pages 109–121, and the like.

Since the above fibrillar polymer is a homopolyester, the degree of freedom in the control of softening point or characteristics such as mechanical strength, flexibility, thermal stability, has been limited to an extremely narrow range. Also, the shape of the fibrillar polymer is extremely unstable with variation in the polymerization conditions as discussed in such prior references.

SUMMARY OF THE INVENTION

In view of the above shortcomings of the prior art, the inventors of the present invention have conducted intensive studies directed to a method for stably obtaining a fibrillar polymer having a large degree of freedom in physical properties, function and quality.

The invention relates to a process for producing a fibrillar copolyester having an aspect ratio of at least 3.0, comprising the step of copolymerizing with shearing at least two different monomers selected from the group consisting of parahydroxybenzoic acid, 2-hydroxy-6-naphthoic acid, and 4'-hydroxy-4-biphenylcarboxylic acid, including the acetylated forms of such monomers, in a nonpolar solvent having 10 or more carbon atoms. Substituents other than hydrogen atoms optionally may be substituted on aromatic rings of such monomers. These include alkyl groups (e.g., methyl, ethyl, etc.), alkoxy groups (e.g., methoxy, ethoxy, etc.), phenol, and halogen atoms (e.g., Cl and Br).

It is preferable that the copolyester is composed of 85 to less than 100 mole percent (i.e. at least 85 mole percent) of one monomer and more than 0 to 15 mole percent (i.e., in a concentration of no more than 15 mole percent) of another monomer. The copolyester is preferred to have the formula (1):

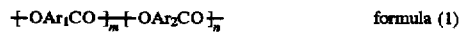  formula (1)

wherein m and n are molar fractions of the recurring units of the polymer of the formula (1), provided that m is 85 or more and less than 100 and n is more than 0 and 15 or less, $Ar_1$ is a group selected from 1,4-phenylene, 2,6-naphthyl and 4,4'-biphenyl, and $Ar_2$ is at least one group selected from 1,4-phenylene, 2,6-naphthyl, and 4,4'-biphenyl with the proviso that the selections of $Ar_1$ and $Ar_2$ are different. Substituents such as alkyl groups (e.g. methyl, ethyl, etc.), alkoxy groups (methoxy, ethoxy, etc.), phenyl groups, and halogen atoms (e.g., Cl and Br) optionally may be present on the aromatic rings of $Ar_1$ and/or $Ar_2$.

It is preferable that a shearing zone be formed during the polymerization with a stirrer having a rotation speed of 80 rpm or more. An acetoxy group may be introduced into the hydroxy aromatic carboxylic acid in a polymerization reactor and the resulting acid may be polymerized directly. The polymerization may be carried out under a reduced pressure in such a manner that the solvent does not evaporate.

The invention provides the copolyester produced by the process as defined above and a resin composite material containing the copolyester as defined above in an amount of at least 5% by weight together with another substance.

The invention includes as an embodiment a method for producing a fibrillar copolyester having an aspect ratio of at least 3.0 and represented by the following formula (1), which comprises copolymerizing with shearing hydroxy aromatic carboxylic acid monomers selected from parahydroxybenzoic acid, 2-hydroxy-6-naphthoic acid, and 4'-hydroxy-4-biphenylcarboxylic acid, including such monomers wherein the hydroxyl groups are acetylated, in a nonpolar solvent having 10 or more carbon atoms to form a fibrillar copolyester of the following structure:

  formula (1)

wherein m and n are molar fraction percents of the recurring units of the polymer of the formula (1), provided that m is 85 or more and less than 100 and n is more than 0 and 15 or less, $Ar_1$ is a group selected from 1,4-phenylene, 2,6-naphthyl, and 4,4'-biphenyl, and $Ar_2$ is at least one group selected from 1,4-phenylene, 2,6-naphthyl, and 4,4'-biphenyl with the proviso that $Ar_1$ and $Ar_2$ are different. Other substituents may optionally be present on the aromatic rings as previously discussed.

It is preferable that $Ar_1$ ranges from 88 to 99 mole percent and that $Ar_2$ ranges from 1 to 12 mole percent. It also is preferable that $Ar_1$ is 1,4-phenylene and $Ar_2$ is 2,6-naphthyl and/or 4,4'-biphenyl.

In other words, the present invention provides a copolyester production method in which a fibrillar copolymer represented by the formula (1) and having an aspect ratio of at least 3.0 is obtained by copolymerizing with shearing at least two hydroxy aromatic carboxylic acid monomers selected from parahydroxybenzoic acid, 2-hydroxy-6-naphthoic acid, and 4'-hydroxy-4-biphenylcarboxylic acid, including such monomers wherein the hydroxyl groups are acetylated, in a nonpolar solvent having 10 or more carbon atoms. Other substituents may optionally be present on the aromatic rings as previously discussed.

The present invention also provides a resin composite material which contains at least 5% by weight of a copolyester and another material (e.g., another thermoplastic or a thermosetting resinous material).

The present invention is detailed hereinafter.

The solvent used in the present invention should be non-reactive in the production of the copolyester and have such a high boiling point that it does not evaporate during polymerization, namely, at least 250° C., and a melting point of 100° C. or less. The solvent needs to be such that a polymer generated by polymerization is insoluble or hardly soluble therein. If the boiling point is less than 250° C., it is difficult to produce the polymer because the polymerization temperature cannot be elevated beyond the boiling point. When active hydrogen or the like is contained in the solvent, the decomposition of the generated polymer occurs disadvantageously. The solvent having 10 or more carbon atoms comprises at least one aromatic compound, such as diisopropylnaphthalene, diethylnaphthalene, ethylisopropylnaphthalene, cyclohexylbiphenyl, diethylbiphenyl, triethylbiphenyl, hydrogenated triphenyl, and the like. Illustrative examples of the solvent include liquid paraffin, diphenyl sulfone, diphenyl ketone and the like, of which, liquid paraffin (e.g., Sarm S paraffin from Shin Nippon Seitetsu Kagaku Co.) and diphenyl ketone are preferred.

The present invention is characterized in that polymerization is carried out under shearing. The zone of shearing generated during the polymerization can be formed between a stirrer and the wall of a reactor by increasing the rotation speed of the stirrer or by generating shearing stress which is created by making the shapes of the stirrer and the reactor cylindrical. The rotation speed of the stirrer is preferably at least 80 rpm.

The starting materials used in the production of the polymer of formula (1) are hydroxy aromatic carboxylic acid monomers, illustrative examples of which include parahydroxybenzoic acid, 2-hydroxy-6-naphthoic acid, and 4'-hydroxy-4-biphenylcarboxylic acid, including such monomers having acetylated hydroxyl groups. Among them, 4-hydroxybenzoic acid and 2-hydroxy-6-naphtoic acid and the ring-substituted derivatives thereof are preferred.

Since a hydroxy aromatic carboxylic acid having an acetylated hydroxy group may be used as a starting material, an acetoxy group may be preliminarily introduced into the hydroxy aromatic carboxylic acid in the reactor where polymerization is carried out and the resulting acid thereafter may be used for direct polymerization.

The reaction temperature is at least 230° C. It is preferably in the range of 250° to 300° C.

Along with the proceeding of the polymerization, it is preferred to remove undesired acetic acid or the like by-products generated during the polymerization from the system. This is made possible by reducing pressure in the reactor to a level so that the solvent used at the time of polymerization does not evaporate. The reduced pressure is preferably 20 Torr or less.

A metal compound such as a tin or titanium compound, or a compound of an alkali metal or alkali earth metal, which is a catalyst commonly used for the polymerization of a polyester, can be employed during the polymerization. A catalyst such as an alkali metal can also be used during any acetylation.

The fibrillar copolyester obtained by the method of the present invention can be mixed into thermoplastic resins or thermosetting resins by a conventional method for admixture to reinforce matrix resins effectively. To obtain a reinforcing effect, the fibrillar copolyester of the present invention preferably is added to the resinous material to be reinforced so that the copolyester is present in the resulting resin composite material in a concentration of at least 5% by weight.

According to the present invention, a fibrillar copolyester having excellent heat resistance, a reinforcing effect and a large aspect ratio (e.g., of at least 3.0) can be produced with high dimensional stability and efficiency.

EXAMPLES

The following examples are provided to further illustrate the present invention. However, it is understood that the present invention is not limited to these examples.

Example 1

300 g of Sarm S-900 paraffin (manufactured by Shin Nippon Seitetsu Kagaku Co.) as a solvent, 12.9 g (97 mol % of the total number of polymer recurring units) of paraacetoxybenzoic acid, and 0.5 g (3 mol % of the total number of polymer recurring units) of 2-acetoxy-6-naphthoic acid were charged into a 500 ml three-necked flask equipped with a nitrogen port, thermometer, stirrer and outlet pipe. The inside of the flask was provided with nitrogen gas. While present under a nitrogen atmosphere, these materials were stirred at 200 rpm and were heated. The temperature was elevated to 330° C. in 30 minutes and a reaction was carried out for 6 hours at that temperature. The resulting reaction product was cooled, filtered, washed with hexane and acetone, and dried at 100° C. for 8 hours.

The resulting copolyester product had a melting temperature of 400° C. or more. It further had an average aspect ratio of 5.2 obtained by processing with an image processing system.

30% by weight of the resulting product was added to polybutylene terephthalate (Geranex 2002 brand manufactured by Polyplastics Co., Ltd.) and a flexural test was made on the resulting mixture in accordance with ASTM D790. It was found to have a flexural strength of 2,100 kgf/cm$^2$. Polybutylene terephthalate alone had a flexural strength of 950 kgf/cm$^2$.

Examples 2 to 4

As shown in Table 1, a reaction was carried out under the same conditions as in Example 1 except that types and amounts of the starting monomers were changed to obtain products, and their physical properties were measured in the same manner as in Example 1. Results are shown in Table 1.

Example 5

In the production of a copolyester, a product was obtained in the same manner as in Example 1 except that 9.6 g (97 mol % of the total number of polymer recurring units) of parahydroxybenzoic acid, 0.7 g (3 mol % of the total number of polymer recurring units) of 2-hydroxy-6-naphthoic acid and 7.6 g of acetic anhydride were used, and its physical properties were measured in the same manner as in Example 1. Results are shown in Table 1.

Example 6, Comparative Example 1

As shown in Table 2, products were obtained by changing experimental conditions and their physical properties were measured in the same manner as in Example 1. The same conditions as in Example 1 except as specified were used. Results are shown in Table 2.

Examples 7 and 8, Comparative Examples 2 and 3

Products were obtained in the same manner as in Example 1 except the polymerization time was changed, and the physical properties were measured in the same manner as in Example 1. Homopolyester products were also obtained by changing the polymerization time as Comparative Examples, and their physical properties were measured in the same manner as in Example 1. Results are shown in Table 2.

Although the aspect ratios of the homopolyesters were unstable according to changes in polymerization time, no change in the aspect ratio was seen in the copolyesters.

TABLE 1

|  |  | Example 1 | Example 2 | Example 3 | Example 4 | Example 5 |
|---|---|---|---|---|---|---|
| $Ar_1$ | Type | 1,4-Ph | 1,4-Ph | 1,4-Ph | 2,6-Nh | 1,4-Ph |
|  | mol % | 97 | 90 | 97 | 97 | 97 |
| $Ar_2$ | Type | 2,6-Nh | 2,6-Nh | biPh | 1,4-Ph | 2,6-Nh |
|  | mol % | 3 | 10 | 3 | 3 | 3 |
| Melting Temperature (°C.) |  | ≧400 | 390 | ≧400 | ≧400 | ≧400 |
| Average Aspect Ratio |  | 5.2 | 4.5 | 5.3 | 5.1 | 5.0 |
| Strength of Added Polymer (kgf/cm$^2$) |  | 2,100 | 2,000 | 2,100 | 2,000 | 2,000 |

* 1,4-Ph; 1,4-phenylene
2,6-Nh; 2,6-naphthyl
biPh; 4,4'-biphenylene

TABLE 2

|  | Example 1 | Comparative Example 1 | Example 6 | Comparative Example 2 | Comparative Example 3 | Example 7 | Example 8 |
|---|---|---|---|---|---|---|---|
| $Ar_1$ |  |  |  |  |  |  |  |
| Type | 1,4-Ph | 1,4-Ph | 1,4-Ph | 1,4-Ph | 1,4-Ph | 1,4-Ph | 1,4-Ph |
| mol % | 97 | 97 | 97 | 100 | 100 | 97 | 97 |
| $Ar_2$ |  |  |  |  |  |  |  |
| Type | 2,6-Nh | 2,6-Nh | 2,6-Nh | 2,6-Nh | 2,6-Nh | 2,6-Nh | 2,6-Nh |
| mol % | 3 | 3 | 3 | 0 | 0 | 3 | 3 |
| Rotation Speed | 200 | 50 | 200 | 200 | 200 | 200 | 200 |
| Reduced Pressure | — | — | 10 | — | — | — | — |
| Reaction Time | 6 | 6 | 6 | 4 | 8 | 4 | 8 |
| Melting Temperature (°C.) | ≧400 | ≧400 | ≧400 | ≧400 | ≧400 | ≧400 | ≧400 |
| Average Aspect Ratio | 5.2 | 2.7 | 5.5 | 5.8 | 3.2 | 5.2 | 5.2 |
| Strength of Added Polymer (kgf/cm$^2$) | 2,100 | 2,150 | 2,150 | 2,150 | 1,600 | 2,100 | 2,100 |

*1,4-Ph; 1,4-phenylene
2,6-Nh; 2,6-naphthyl

We claim:

1. A process for producing a fibrillar copolyester having an aspect ratio of at least 3.0, comprising copolymerizing with shearing at least two different hydroxy aromatic carboxylic acid monomers selected from the group consisting of parahydroxybenzoic acid, 2-hydroxy-6-naphthoic acid, and 4'-hydroxy-4-biphenylcarboxylic acid wherein one or more of said monomers optionally possess hydroxyl groups that are acetylated while present in a nonpolar solvent having 10 or more carbon atoms.

2. The process as claimed in claim 1, in which the copolyester is composed of 85 to less than 100 mole percent of one of said monomers and more than 0 to 15 of another of said monomers.

3. The process as claimed in claim 1, in which the copolyester has the formula (1):

$$\text{\textemdash}\!\!\text{OAr}_1\text{CO}\!\!\text{\textendash}_m\text{\textemdash}\!\!\text{OAr}_2\text{CO}\!\!\text{\textendash}_n \qquad \text{formula (1)}$$

wherein m and n are molar fractions of the recurring units of the polymer of the formula (1), provided that m is 85 or more and less than 100 and n is more than 0 and 15 or less, $Ar_1$ is a group selected from 1,4-phenylene, 2,6-naphthyl and 4,4'-biphenyl, and $Ar_2$ is at least one group selected from 1,4-phenylene, 2,6-naphthyl, and 4,4'-biphenyl, with the proviso that $Ar_1$ and $Ar_2$ are different.

4. The process as claimed in claim 1, in which a shearing zone is formed during the polymerization with a stirrer having a rotation speed of at least 80 rpm or more.

5. The process as claimed in claim 1, in which an acetoxy group is introduced into said hydroxy aromatic carboxylic acid monomers in a polymerization reactor and the resulting acetylated acid monomers are polymerized.

6. The process as claimed in claim 1, in which the polymerization is carried out under a reduced pressure.

7. A process as claimed in claim 1, wherein said nonpolar solvent is selected from the group consisting of liquid paraffin, and diphenyl ketone.

8. The fibrillar copolyester produced by the process as defined in claim 1.

9. A resin composite material containing the fibrillar copolyester as defined in claim 8 as reinforcement in an amount of at least 5% by weight and a second resinous material.

10. A resin composite material according to claim 9, wherein said second resinous material is polybutylene terephthalate.

11. A process for producing a fibrillar copolyester having an aspect ratio of at least 3.0, comprising copolymerizing with shearing at a stirrer rotation speed of at least 80 rpm at least two different hydroxy aromatic carboxylic acid monomers selected from the group consisting of parahydroxybenzoic acid, 2-hydroxy-6-naphthoic acid, and 4'-hydroxy-4-biphenylcarboxylic acid, while present in a nonpolar solvent selected from the group consisting of liquid paraffin and diphenyl ketone.

12. A process as claimed in claim 11 wherein said monomers are parahydroxybenzoic acid and 2-hydroxy-6-naphthoic acid.

13. A process as claimed in claim 11 wherein said shearing is created by a stirrer rotation speed of 200 rpm.

14. A process as claimed in claim 11 wherein said nonpolar solvent is liquid paraffin.

15. A process as claimed in claim 11 wherein said nonpolar solvent is diphenyl ketone.

16. A fibrillar copolyester produced by the process as defined in claim 11.

17. A resin composite material containing the fibrillar copolymer as defined in claim 16 as reinforcement in an amount of at least 5% by weight and a second resinous material.

* * * * *